(12) United States Patent
Kuzusako et al.

(10) Patent No.: US 7,670,541 B2
(45) Date of Patent: Mar. 2, 2010

(54) OPTICAL SHAPING APPARATUS AND OPTICAL SHAPING METHOD

(75) Inventors: Junichi Kuzusako, Saitama (JP); Nobuhiro Kihara, Kanagawa (JP); Katsuhisa Honda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/326,290

(22) Filed: Dec. 2, 2008

(65) Prior Publication Data
US 2009/0140466 A1 Jun. 4, 2009

(30) Foreign Application Priority Data
Dec. 3, 2007 (JP) ............... 2007-312027

(51) Int. Cl.
B29C 35/04 (2006.01)
B29C 35/08 (2006.01)
B28B 17/00 (2006.01)
G06F 19/00 (2006.01)

(52) U.S. Cl. .................. 264/401; 264/497; 425/174.4; 700/120

(58) Field of Classification Search .......... 264/401, 264/497; 425/174.4; 700/120
See application file for complete search history.

(56) References Cited
U.S. PATENT DOCUMENTS
5,711,911 A * 1/1998 Hull ................... 264/401
6,036,911 A * 3/2000 Allison et al. ............. 264/401
6,207,097 B1   3/2001 Iverson
6,399,010 B1 * 6/2002 Guertin et al. ............ 264/401

FOREIGN PATENT DOCUMENTS
JP 06-095257 4/1994
WO 92/20505 11/1992

OTHER PUBLICATIONS
European Search Report dated Feb. 3, 2009.

* cited by examiner

Primary Examiner—Joseph S. Del Sole
Assistant Examiner—David N Brown, II
(74) Attorney, Agent, or Firm—Sonnenschein Nath & Rosenthal LLP

(57) ABSTRACT

The cross-sectional shape data of a three-dimensional model is divided according to work small areas obtained by dividing a work entire area where optical shaping work is performed into a plurality of areas, and work small area data which is cross-sectional shape data corresponding to said work small areas is generated. Also, the work small area data is enlarged with offset width based on the contracting ratio of a light hardening resin, and areas, which are wider than the work small areas on the surface of the light hardening resin by the offset width, are subjected to one-shot exposure based on the enlarged work small area data to form a hardening layer for each of the work small areas. The present invention can be applied to, for example, an optical shaping apparatus.

8 Claims, 7 Drawing Sheets

α: FIRST OFFSET (CONTRACTING WORTH OF RESIN)
β: SECOND OFFSET (ARBITRARY) (OVERLAPPED WORTH BETWEEN WORK SMALL AREAS)

OUTSIDE DIMENSIONS AFTER HARDENING

FIG. 2
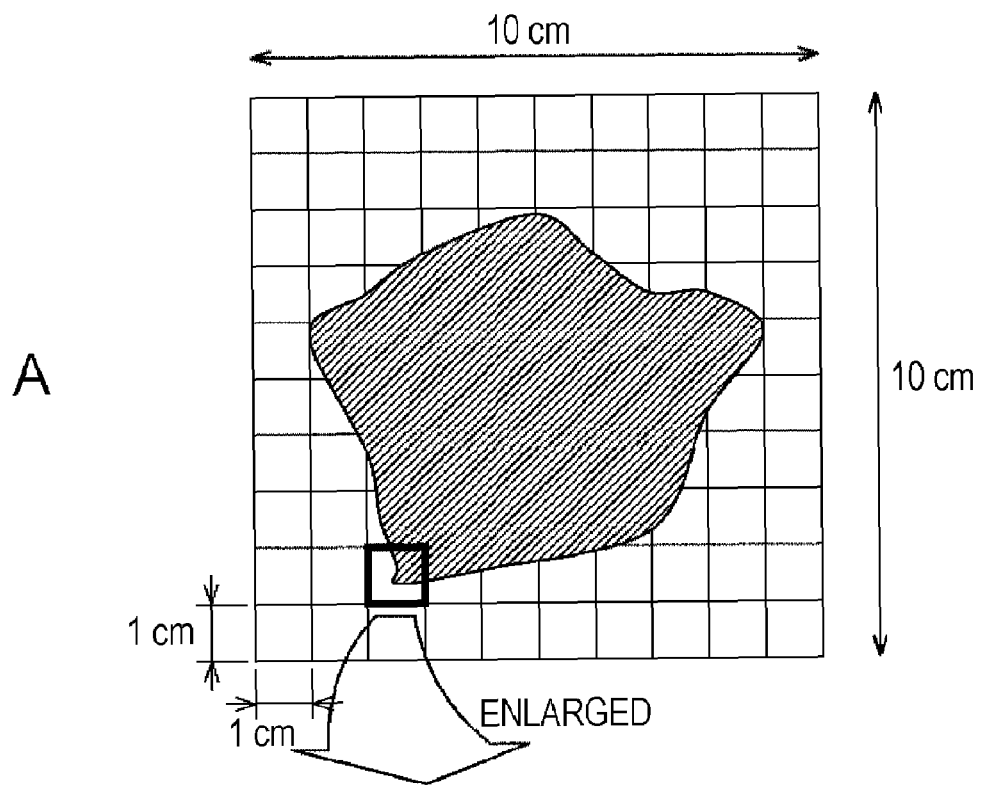
A
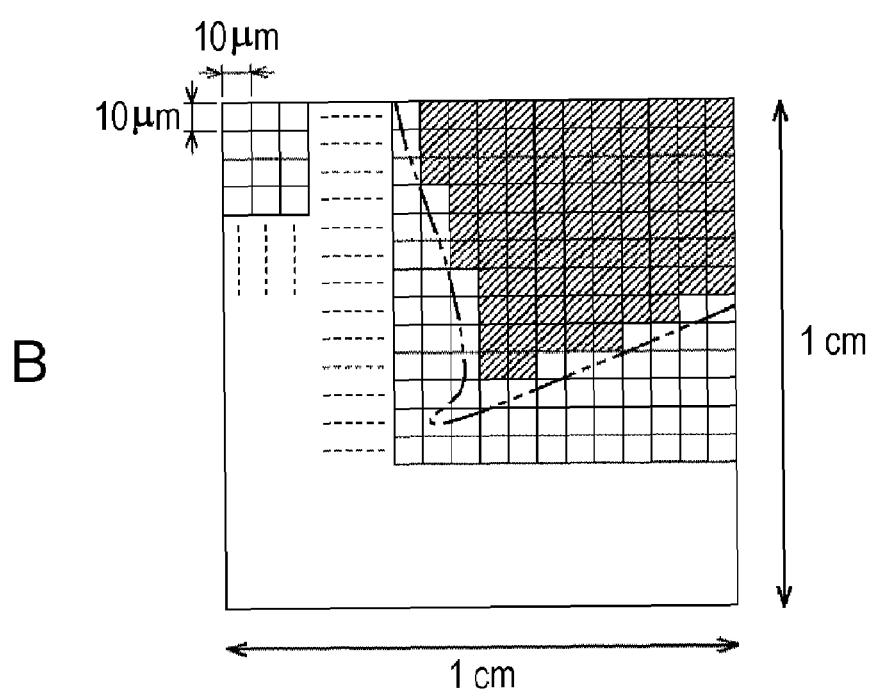
B

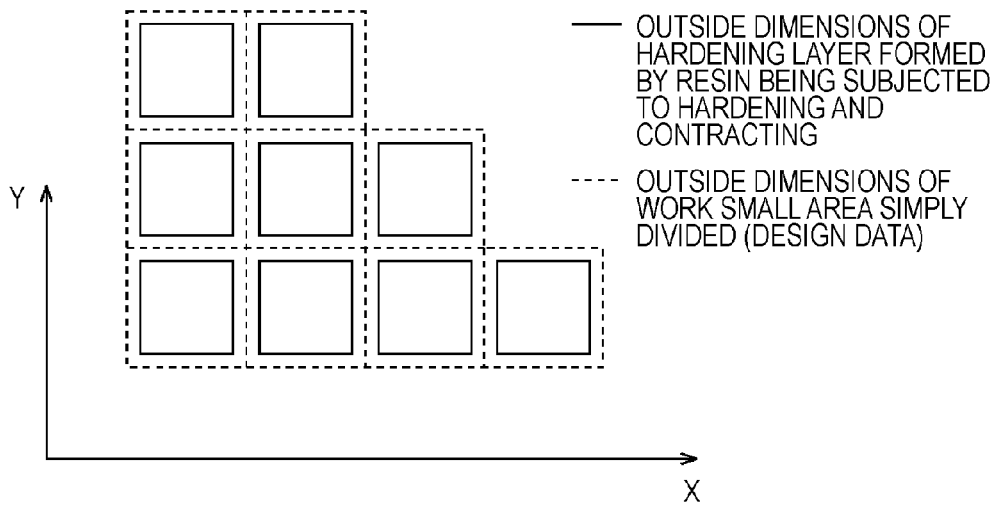

FIG. 3A

— OUTSIDE DIMENSIONS OF HARDENING LAYER FORMED BY RESIN BEING SUBJECTED TO HARDENING AND CONTRACTING

---- OUTSIDE DIMENSIONS OF WORK SMALL AREA SIMPLY DIVIDED (DESIGN DATA)

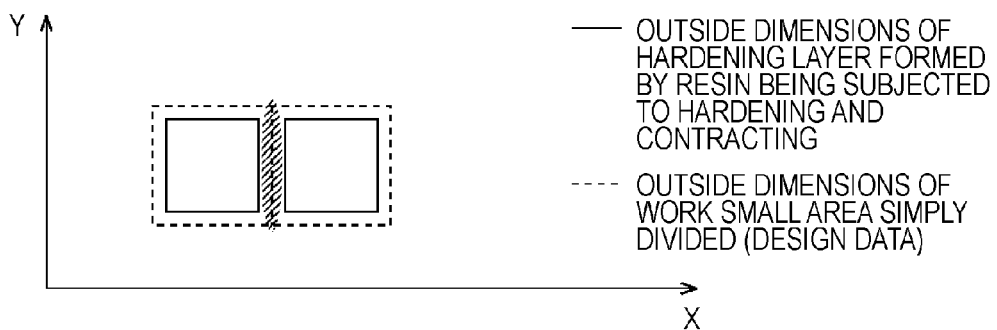

FIG. 3B

— OUTSIDE DIMENSIONS OF HARDENING LAYER FORMED BY RESIN BEING SUBJECTED TO HARDENING AND CONTRACTING

---- OUTSIDE DIMENSIONS OF WORK SMALL AREA SIMPLY DIVIDED (DESIGN DATA)

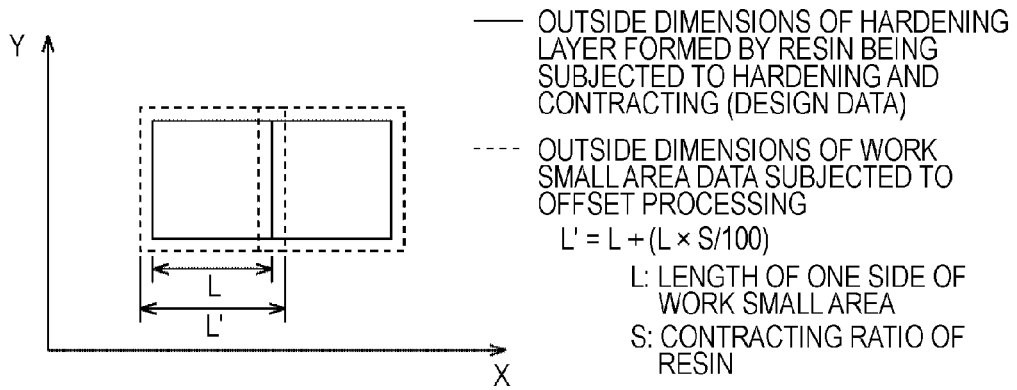

FIG. 4

— OUTSIDE DIMENSIONS OF HARDENING LAYER FORMED BY RESIN BEING SUBJECTED TO HARDENING AND CONTRACTING (DESIGN DATA)

---- OUTSIDE DIMENSIONS OF WORK SMALL AREA DATA SUBJECTED TO OFFSET PROCESSING $L' = L + (L \times S/100)$ $L$: LENGTH OF ONE SIDE OF WORK SMALL AREA $S$: CONTRACTING RATIO OF RESIN

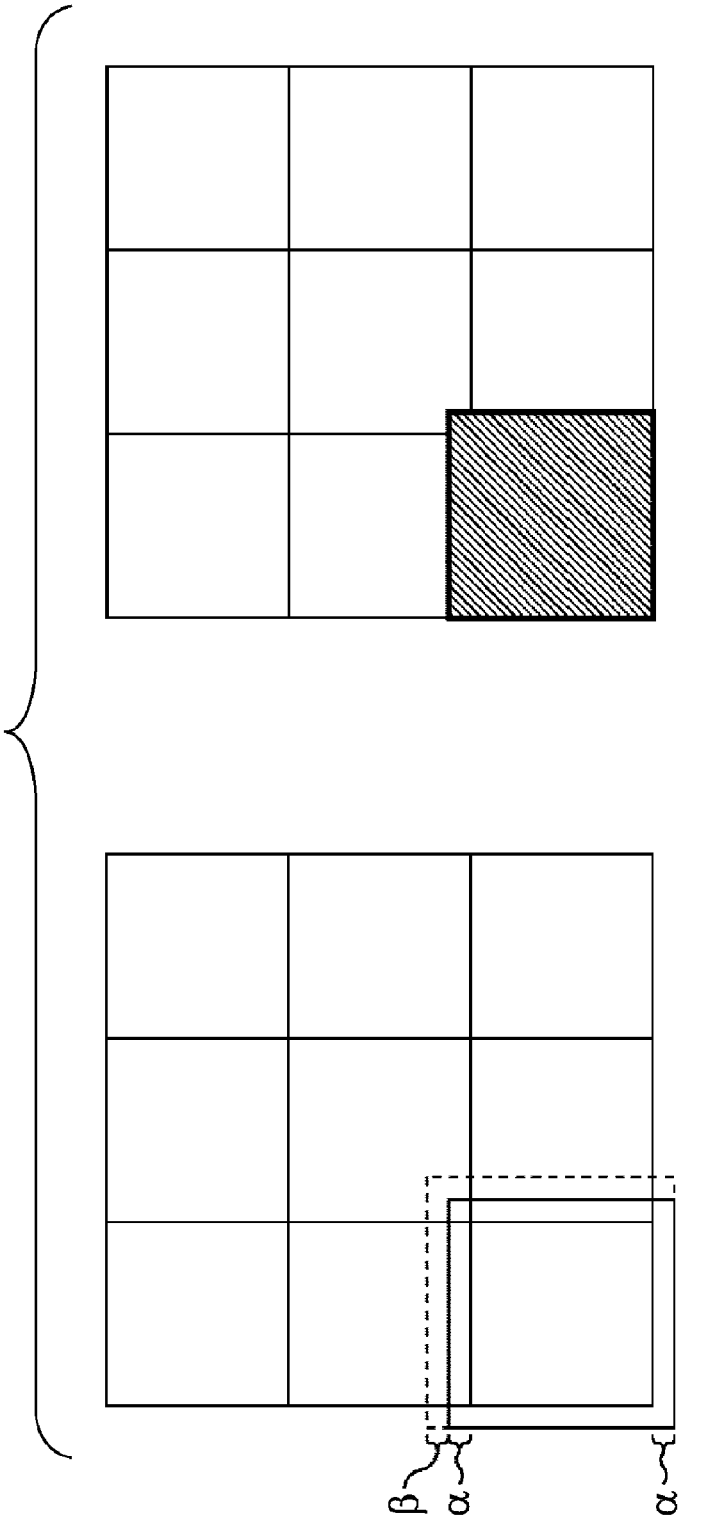

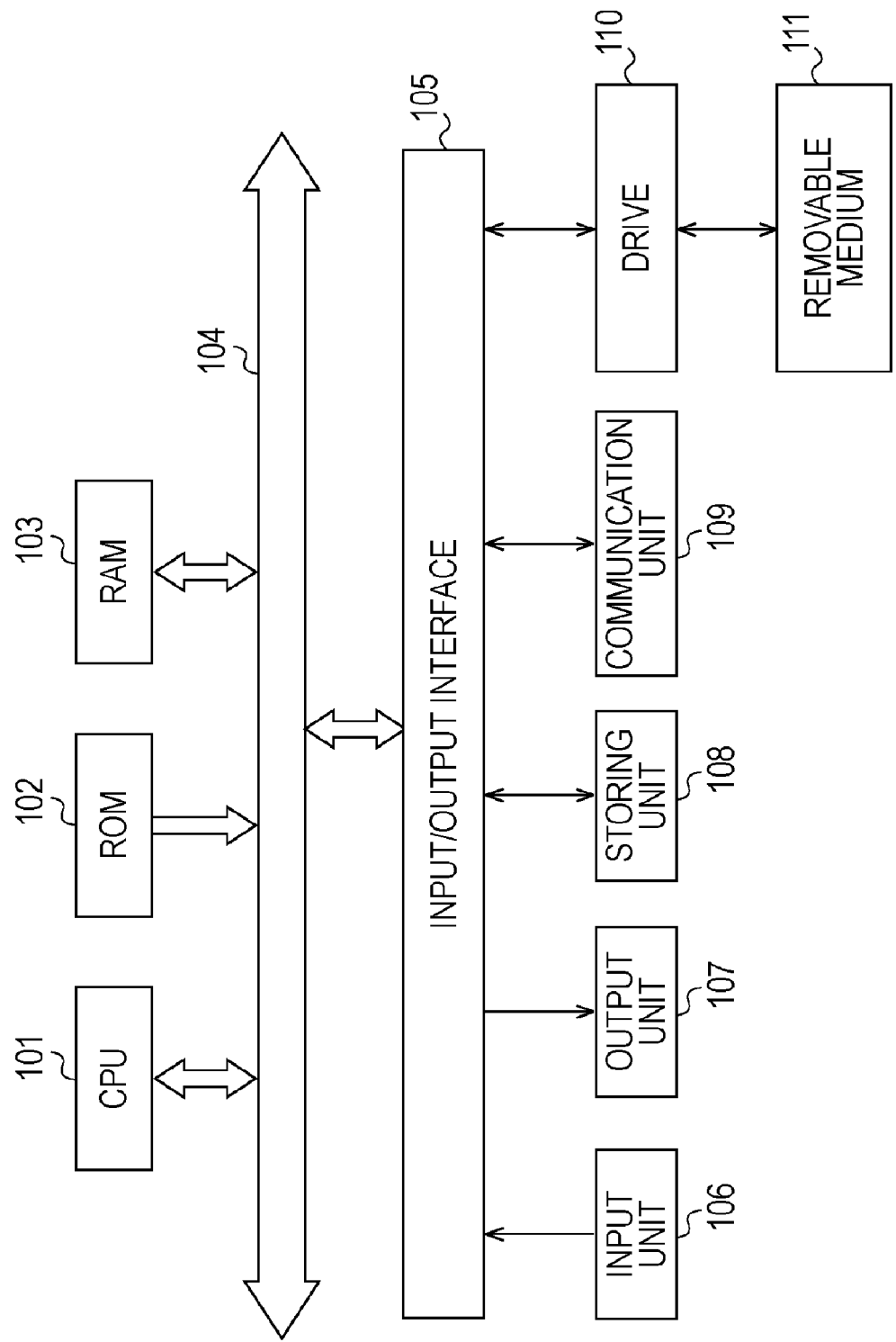

OPTICAL SHAPING APPARATUS AND OPTICAL SHAPING METHOD

CROSS REFERENCES TO RELATED APPLICATIONS

The present invention contains subject matter related to Japanese Patent Application JP 2007-312027 filed in the Japanese Patent Office on Dec. 3, 2007, the entire contents of which are incorporated herein by reference.

BACKGROUND OF THE INVENTION

1. Field of the Invention

The present invention relates to an optical shaping apparatus and optical shaping method, and particularly, relates to an optical shaping apparatus and optical shaping method whereby a high-precision shaped object can be shaped with high strength.

2. Description of the Related Art

Heretofore, when employing three-dimensional shape data created with CAD (Computer Aided Design) to create a three-dimensional model (shaped object), for example, a machining device or the like which is numerically-controlled is employed to create a three-dimensional model by machining.

Also, in recent years, a technique called rapid prototyping (RP) for creating a three-dimensional model without performing machining has caught attention in a great number of manufacturing fields. With rapid prototyping, a manufacturing technique called a layering shaping method is employed wherein cross-sectional shaped thin plates are created by a three-dimensional model being sliced based on the three-dimensional shape data of the three-dimensional model, and the cross-sectional shaped thin plates thereof are layered, thereby creating a three-dimensional model.

Also, according to this technique for creating cross-sectional shaped thin plates, rapid prototyping is classified into optical shaping employing an ultraviolet hardening resin, a method for extrusion-layering thermoplastic resins (FDM), a powder melt adhesion layering method (SLS), a paper thin-film layering method (LOM), a method for discharge-layering powder or hardening catalyst (Ink-Jet method), and so forth.

For example, with optical shaping, the three-dimensional shape data of a three-dimensional model created by CAD is transformed into STL (Stereo Lithography) which is a format wherein the surface of the three-dimensional model is expressed with a small triangle face, and is input to an optical shaping apparatus.

The optical shaping apparatus generates cross-sectional shape data wherein the three-dimensional model is sliced with a certain interval of, for example, around 0.1 through 0.2 mm, from the three-dimensional shape data, and determines an irradiation area of light to be irradiated on the surface of a liquid light hardening resin according to the generated cross-sectional shape data. The optical shaping apparatus irradiates light of the irradiation area corresponding to the cross-sectional shape data thereof on the surface of the liquid light hardening resin for each layer of the cross-sectional shape data, and moves a moving trestle within the liquid light hardening resin downward in the vertical direction according to the thickness of the slices of the three-dimensional model. Subsequently, the optical shaping apparatus repeats irradiation of light and movement of the moving trestle from the lowermost layer to the uppermost layer of the cross-sectional shape data, thereby generating a three-dimensional model.

Now, with Japanese Unexamined Patent Application Publication No. 6-95257, an image recording apparatus has been disclosed, which employs a spatial light modulator to modulate ultraviolet rays according to image data, and records an image on a photosensitive resin by the ultraviolet rays thereof.

SUMMARY OF THE INVENTION

The optical shaping apparatus according to the related art is configured such as described above. There has been recognized demand for an apparatus which can shape a higher precision shaped object than the optical shaping apparatus according to the related art with high strength, and to enable a high-precision shaped object to be shaped with high strength.

With an optical shaping apparatus according to an embodiment of the present invention, an optical shaping apparatus configured to irradiate light according to the cross-sectional shape data of a three-dimensional model on the surface of a light hardening resin to form a hardening layer, and layer the hardening layer to shape the three-dimensional model, includes: a data generating unit configured to divide the cross-sectional shape data of the three-dimensional model according to work small areas obtained by dividing a work entire area where optical shaping work is performed into a plurality of areas, and generate work small area data which is cross-sectional shape data corresponding to the work small areas; an enlarging unit configured to enlarge the work small area data with offset width based on the contracting ratio of the light hardening resin; and a one-shot exposing unit configured to subject areas, which are wider than the work small areas on the surface of the light hardening resin by the offset width, to one-shot exposure based on the work small area data enlarged by the enlarging unit to form the hardening layer for each of the work small areas.

With an optical shaping method according to an embodiment of the present invention, an optical shaping method adapted to irradiate light according to the cross-sectional shape data of a three-dimensional model on the surface of a light hardening resin to form a hardening layer, and layer the hardening layer to shape the three-dimensional model, includes the steps of: dividing the cross-sectional shape data of the three-dimensional model according to work small areas obtained by dividing a work entire area where optical shaping work is performed into a plurality of areas, and generating work small area data which is cross-sectional shape data corresponding to the work small areas; enlarging the work small area data with offset width based on the contracting ratio of the light hardening resin; and subjecting areas, which are wider than the work small areas on the surface of the light hardening resin by the offset width, to one-shot exposure based on the work small area data to form the hardening layer for each of the work small areas.

According to the above configuration, the cross-sectional shape data of the three-dimensional model is divided according to work small areas obtained by dividing a work entire area where optical shaping work is performed into a plurality of areas, thereby generating work small area data which is cross-sectional shape data corresponding to the work small areas. Also, the work small area data is enlarged with offset width based on the contracting ratio of the light hardening resin, and areas, which are wider than the work small areas on the surface of the light hardening resin by the offset width, are subjected to one-shot exposure based on the work small area data to form the hardening layer for each of the work small areas.

With an optical shaping apparatus according to an embodiment of the present invention, an optical shaping apparatus configured to irradiate light according to the cross-sectional shape data of a three-dimensional model on the surface of a light hardening resin to form a hardening layer, and layer the hardening layer to shape the three-dimensional model, includes: a data generating unit configured to divide the cross-sectional shape data of the three-dimensional model according to work small areas obtained by dividing a work entire area where optical shaping work is performed into a plurality of areas, and generate work small area data which is cross-sectional shape data corresponding to the work small areas; an adding unit configured to add data with certain width from a border line between the predetermined work small area and the other work small areas, of work small area data corresponding to the other work small areas adjacent to the predetermined work small area, to the work small area data corresponding to the predetermined work small area, thereby offsetting the border line of the predetermined work small area; and a one-shot exposing unit configured to subject areas, which are wider than the work small areas on the surface of the light hardening resin by the certain width, to one-shot exposure based on the work small area data offset by the adding unit to form the hardening layer for each of the work small areas.

With an optical shaping method according to an embodiment of the present invention, an optical shaping method adapted to irradiate light according to the cross-sectional shape data of a three-dimensional model on the surface of a light hardening resin to form a hardening layer, and layer the hardening layer to shape the three-dimensional model, includes the steps of: dividing the cross-sectional shape data of the three-dimensional model according to work small areas obtained by dividing a work entire area where optical shaping work is performed into a plurality of areas, and generating work small area data which is cross-sectional shape data corresponding to the work small areas; adding data with certain width from a border line between the predetermined work small area and the other work small areas, of work small area data corresponding to the other work small areas adjacent to the predetermined work small area, to the work small area data corresponding to the predetermined work small area, thereby offsetting the border line of the predetermined work small area; and subjecting areas, which are wider than the work small areas on the surface of the light hardening resin by the certain width, to one-shot exposure based on the work small area data to form the hardening layer for each of the work small areas.

According to the above configuration, the cross-sectional shape data of the three-dimensional model is divided according to work small areas obtained by dividing a work entire area where optical shaping work is performed into a plurality of areas, thereby generating work small area data which is cross-sectional shape data corresponding to the work small areas. Also, of work small area data corresponding to the other work small areas adjacent to the predetermined work small area, data with certain width from a border line between the predetermined work small area and the other work small areas is added to the work small area data corresponding to the predetermined work small area, thereby offsetting the border line of the predetermined work small area. Subsequently, areas, which are wider than the work small areas on the surface of the light hardening resin by the certain width, are subjected to one-shot exposure based on the work small area data to form the hardening layer for each of the work small areas.

Thus, according to the above configurations, a high-precision shaped object can be shaped with high strength.

BRIEF DESCRIPTION OF THE DRAWINGS

FIG. 2 is a diagram for describing optical shaping according to a tiling method;

FIGS. 3A and 3B are diagrams for describing influence by an ultraviolet hardening resin being subjected to hardening and contracting;

FIG. 4 is a diagram for describing a hardening layer of work small areas formed based on work small area data subjected to offset processing;

FIG. 5 is a diagram for describing offset;

FIG. 8 is a block diagram illustrating a configuration example of a computer.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to the other features of the claims.

Figure 1:
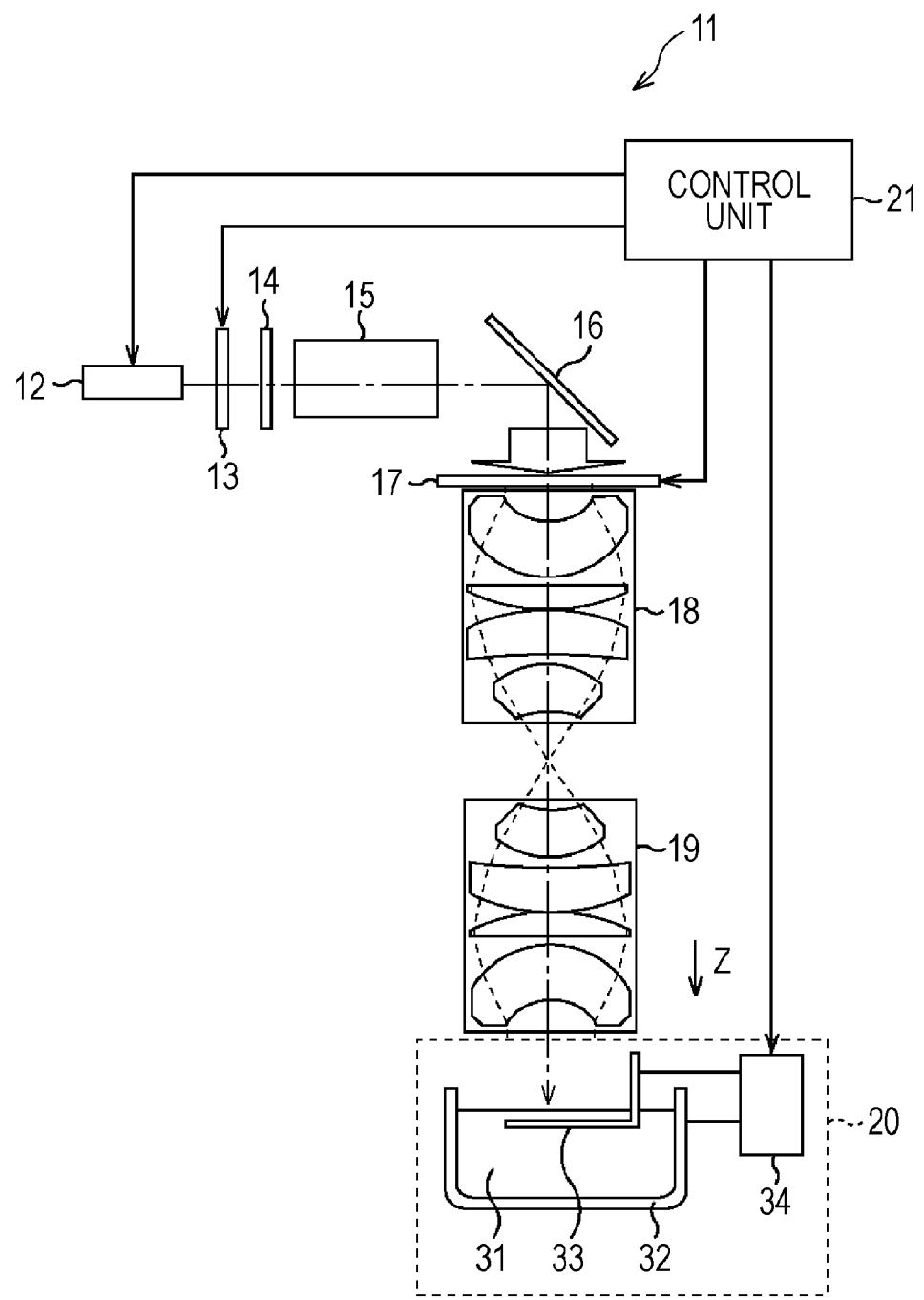
FIG. 1 is a block diagram illustrating a configuration example of an optical shaping apparatus to which an embodiment of the present invention has been applied.
Figure 7:
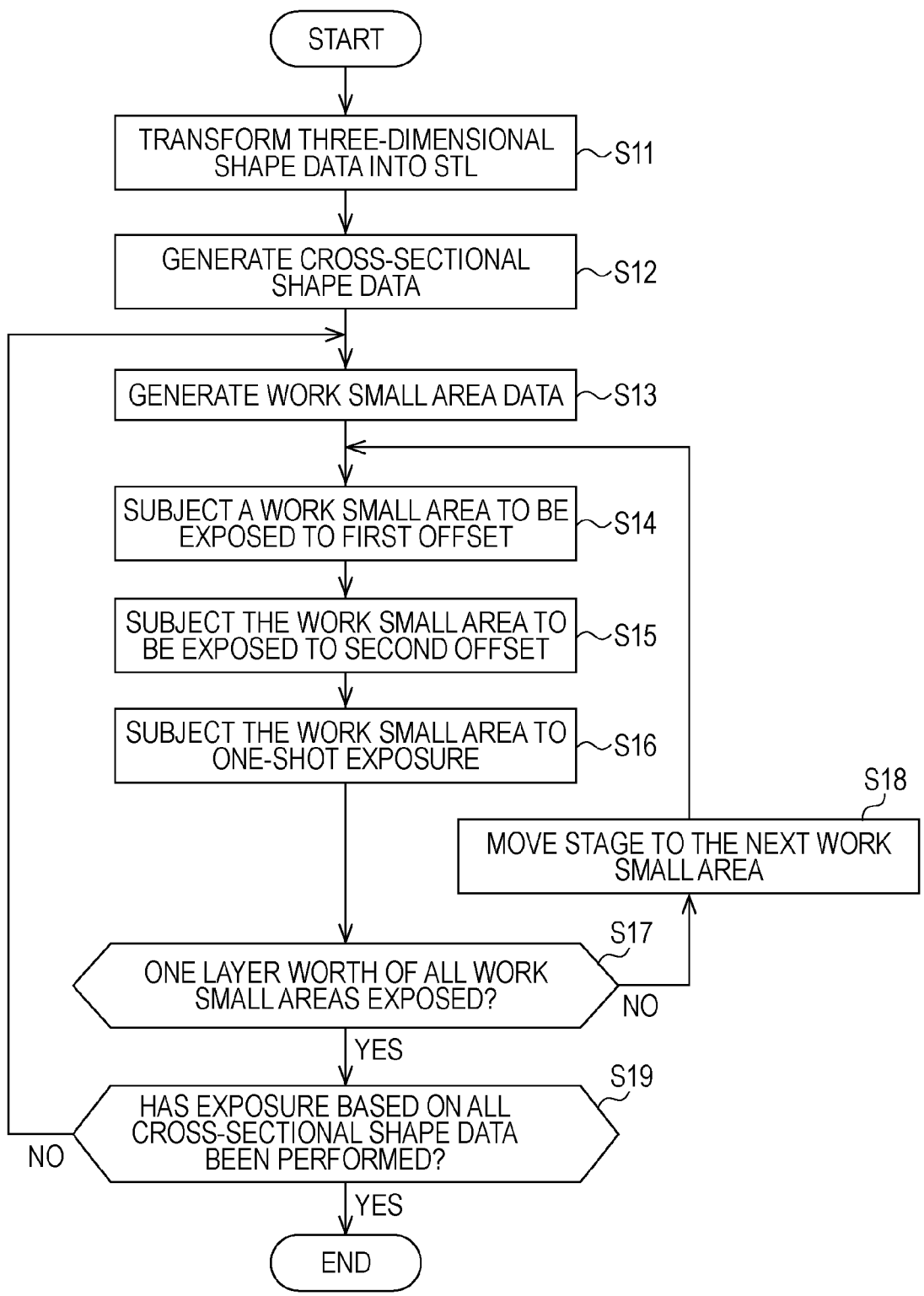
FIG. 7 is a flowchart for describing processing for performing optical shaping according to an optical shaping apparatus 11.

With an optical shaping apparatus according to an embodiment of the present invention, an optical shaping apparatus configured to irradiate light according to the cross-sectional shape data of a three-dimensional model on the surface of a light hardening resin to form a hardening layer, and layer the hardening layer to shape the three-dimensional model, includes: a data generating unit configured to divide the cross-sectional shape data of the three-dimensional model according to work small areas obtained by dividing a work entire area where optical shaping work is performed into a plurality of areas, and generate work small area data which is cross-sectional shape data corresponding to the work small areas (e.g., control unit 21 in FIG. 1 for executing processing in step S13 in FIG. 7); an enlarging unit configured to enlarge the work small area data with offset width based on the contracting ratio of the light hardening resin (e.g., control unit 21 in FIG. 1 for executing processing in step S14 in FIG. 7); and a one-shot exposing unit configured to subject areas, which are wider than the work small areas on the surface of the light hardening resin by the offset width, to one-shot exposure based on the work small area data enlarged by the enlarging unit to form the hardening layer for each of the work small areas (e.g., control unit 21 in FIG. 1 for executing processing in step S16 in FIG. 7).

Also, the optical shaping apparatus according to an embodiment of the present invention may further include an adding unit configured to add data with certain width from a border line between the predetermined work small area and the other work small areas, of work small area data corresponding to the other work small areas adjacent to the predetermined work small area, to the work small area data corresponding to the predetermined work small area, thereby offsetting the border line of the predetermined work small area (e.g., control unit 21 in FIG. 1 for executing processing in step S15 in FIG. 7); with the one-shot exposing unit subjecting areas, which are wider than the work small areas on the surface of the light hardening resin by width obtained by adding the certain width and the offset width, to one-shot exposure based on the work small area data offset by the adding unit, and enlarged by the enlarging unit.

With an optical shaping method according to an embodiment of the present invention, an optical shaping method adapted to irradiate light according to the cross-sectional shape data of a three-dimensional model on the surface of a light hardening resin to form a hardening layer, and layer the hardening layer to shape the three-dimensional model, includes the steps of: dividing the cross-sectional shape data of the three-dimensional model according to work small areas obtained by dividing a work entire area where optical shaping work is performed into a plurality of areas, and generating work small area data which is cross-sectional shape data corresponding to the work small areas (e.g., step S13 in FIG. 7); enlarging the work small area data with offset width based on the contracting ratio of the light hardening resin (e.g., step S14 in FIG. 7); and subjecting areas, which are wider than the work small areas on the surface of the light hardening resin by the offset width, to one-shot exposure based on the work small area data to form the hardening layer for each of the work small areas (e.g., step S16 in FIG. 7).

With an optical shaping apparatus according to an embodiment of the present invention, an optical shaping apparatus configured to irradiate light according to the cross-sectional shape data of a three-dimensional model on the surface of a light hardening resin to form a hardening layer, and layer the hardening layer to shape the three-dimensional model, includes: a data generating unit configured to divide the cross-sectional shape data of the three-dimensional model according to work small areas obtained by dividing a work entire area where optical shaping work is performed into a plurality of areas, and generate work small area data which is cross-sectional shape data corresponding to the work small areas (e.g., control unit 21 in FIG. 1 for executing processing in step S13 in FIG. 7); an adding unit configured to add data with certain width from a border line between the predetermined work small area and the other work small areas, of work small area data corresponding to the other work small areas adjacent to the predetermined work small area, to the work small area data corresponding to the predetermined work small area, thereby offsetting the border line of the predetermined work small area (e.g., control unit 21 in FIG. 1 for executing processing in step S15 in FIG. 7); and a one-shot exposing unit configured to subject areas, which are wider than the work small areas on the surface of the light hardening resin by the certain width, to one-shot exposure based on the work small area data offset by the adding unit to form the hardening layer for each of the work small areas (e.g., control unit 21 in FIG. 1 for executing processing in step S16 in FIG. 7).

Also, the optical shaping apparatus according to an embodiment of the present invention may further include an enlarging unit configured to enlarge the work small area data with offset width based on the contracting ratio of the light hardening resin (e.g., control unit 21 in FIG. 1 for executing processing in step S14 in FIG. 7); with the one-shot exposing unit subjecting areas, which are wider than the work small areas on the surface of the light hardening resin by width obtained by adding the certain width and the offset width, to one-shot exposure based on the work small area enlarged by the enlarging unit, and offset by the adding unit.

With an optical shaping method according to an embodiment of the present invention, an optical shaping method adapted to irradiate light according to the cross-sectional shape data of a three-dimensional model on the surface of a light hardening resin to form a hardening layer, and layer the hardening layer to shape the three-dimensional model, includes the steps of: dividing the cross-sectional shape data of the three-dimensional model according to work small areas obtained by dividing a work entire area where optical shaping work is performed into a plurality of areas, and generating work small area data which is cross-sectional shape data corresponding to the work small areas (e.g., step S13 in FIG. 7); adding data with certain width from a border line between the predetermined work small area and the other work small areas, of work small area data corresponding to the other work small areas adjacent to the predetermined work small area, to the work small area data corresponding to the predetermined work small area, thereby offsetting the border line of the predetermined work small area (e.g., step S15 in FIG. 7); and subjecting areas, which are wider than the work small areas on the surface of the light hardening resin by the certain width, to one-shot exposure based on the work small area data to form the hardening layer for each of the work small areas (e.g., step S16 in FIG. 7).

Description will be made below in detail regarding specific embodiments to which the present invention has been applied, with reference to the drawings.

FIG. 1 is a block diagram illustrating a configuration example of an optical shaping apparatus to which an embodiment of the present invention has been applied. In FIG. 1, an optical shaping apparatus 11 is configured of a light source 12, shutter 13, polarizing plate 14, beam integrator 15, mirror 16, spatial light modulator 17, condensing lens 18, objective lens 19, work unit 20, and control unit 21.

A light source where high-output blue LEDs are disposed in an array fashion can be employed as the light source 12. The light source 12 irradiates light for exposing an ultraviolet hardening layer 31 of the work unit 20 to form a hardening layer. Note that a coherent laser light source does not have to be employed as the light source 12.

The shutter 13 passes or shields light irradiated from the light source 12, and controls on/off of exposure of the ultraviolet hardening resin 31 according to the light from the light source 12, in accordance with control of the control unit 21.

The polarizing plate 14 converts the light passed through the shutter 13 into predetermined polarization light. That is to say, the polarizing plate 14 polarizes the light from the light source 12 such that the spatial light modulator 17 made up of a transmissive liquid crystal panel can subject the light from the light source 12 to spatial modulation.

The beam integrator 15 makes uniform the light polarized by the polarizing plate 14. A common type is employed as the beam integrator 15, such as a fly eye type made up of multiple lens elements being arrayed, a light rod type having a configuration wherein the inside of a rod lens in a columnar shape such as a quadratic prism or the like is total-reflected, or the like.

The mirror 16 reflects the light uniformed by the beam integrator 15 toward the spatial light modulator 17. The spatial light modulator 17 is made up of, for example, a transmissive liquid crystal panel, and subjects a part of the light reflected by the mirror 16 to spatial modulation in accordance with control of the control unit 21 such that the light reflected by the mirror 16 exposes an irradiation area corresponding to the cross-sectional shape data on the ultraviolet hardening resin 31.

That is to say, a driving signal for driving each pixel of the liquid crystal panel is supplied, according to the cross-sectional shape data, to the spatial light modulator 17 from the control unit 21, and the spatial light modulator 17 changes the array of liquid crystal molecules of the pixel corresponding to an irradiation area based on the driving signal thereof to change the polarization direction where light transmits. Thus, the spatial light modulator 17 subjects the light passed through the liquid crystal panel to spatial modulation, and projects the light having the shape corresponding to the cross-sectional shape data on the ultraviolet hardening resin 31 with the areas corresponding to one pixel of the liquid crystal panel as a unit area for performing exposure.

The condensing lens 18 is configured of a lens group for correcting distortion at the time of the light subjected to spatial modulation by the spatial light modulator 17 passing through the objective lens 19, and condenses the light subjected to spatial modulation by the spatial light modulator 17 on the anterior focal point of the objective lens 19. For example, each of lens groups is configured such that the condensing lens 18 and objective lens 19 make up a symmetric optical system, whereby distortion can be reduced.

The objective lens 19 is configured of a lens group made up of a single or multiple lenses, and image-forms the light subjected to spatial modulation by the spatial light modulator 17 on the surface of the ultraviolet hardening resin 31.

Now, the objective lens 19 is configured so as to condense the optical beam from an unshown beam scanning optical system at the time of one-shot exposure according to the light from the light source 12, and beam scanning exposure according to the optical beam from the beam scanning optical system being performed, such that the optical beam is scanned on the surface of the ultraviolet hardening resin 31 at equal speed, i.e., the optical beam is scanned on the surface of the ultraviolet hardening resin 31 at uniform scanning speed.

For example, a so-called fθ lens is employed as the objective lens 19, which has an image height Y proportional to an incident angle θ, and a relation (Y=f×θ) wherein a product between a focal length f and the incident angle θ is the image height Y. In other words, the fθ lens is a lens designed such that the scanning speed of an optical beam to be scanned is constant regardless of an incident position to the lens. Such an objective lens 19 is employed, whereby occurrence of difference between a design shape and an actual hardening layer shape due to the irregularities of scanning speed can be prevented, and accordingly, high-definition shaping is realized. Note that a lens having a normal condensing function may be employed as the objective lens 19 instead of the fθ lens.

The work unit 20 is configured of a housing container 32, stage 33, and driving unit 34. The housing container 32 houses the liquid ultraviolet hardening resin 31.

The stage 33 is dipped in the liquid ultraviolet hardening resin 31 of the housing container 32, and is movable at least in the vertical direction (direction of an arrow Z in FIG. 1) orthogonal to liquid level which is the surface of the ultraviolet hardening resin 31. Also, the stage 33 is configured so as to be movable in the direction along the liquid level which is the surface of the ultraviolet hardening resin 31 (i.e., X-Y direction perpendicular to the direction of the arrow Z).

The driving unit 34 drives the housing container 32 and stage 33 in accordance with control of the control unit 21. For example, in response to a situation wherein the ultraviolet hardening resin 31 is exposed according to the cross-sectional shape data of a three-dimensional model, and one hardening layer of the three-dimensional model is formed, the driving unit 34 drives the stage 33 downward in the vertical direction step by step. Also, the driving unit 34 drives the housing container 32 in the vertical direction such that the surface of the ultraviolet hardening resin 31 is identical to the rear-side focal position of the objective lens 19.

Also, the driving unit 34 moves the stage 33 in the direction along with the surface of the ultraviolet hardening resin 31 (X-Y direction) for each of later-described work small areas (FIG. 2).

The control unit 21 controls the light source 12 to turn on/off irradiation of light from the light source 12, controls the shutter 13 to turn on/off exposure of the ultraviolet hardening resin 31, and controls the driving unit 34 to drive the housing container 32 and stage 33. Also, the control unit 21 supplies a driving signal for driving each pixel of the spatial light modulator 17 to the spatial light modulator 17 such that the pixel of the spatial light modulator 17 corresponding to an irradiation area transmits light, based on the cross-sectional shape data of the three-dimensional model.

Also, the control unit 21 controls each unit of the optical shaping apparatus 11 such that optical shaping is performed, for example, with a tiling method wherein a work entire area which is all areas where optical shaping work is performed is divided into multiple work small areas, and one-shot exposure is performed for each of the work small areas, thereby forming a hardening layer.

Description will be made regarding optical shaping according to the tiling method with reference to FIG. 2. A work entire area which is all areas where optical shaping work is performed is illustrated in A in FIG. 2, and work small areas which a part of the work entire area are illustrated in B in FIG. 2. In FIG. 2, the work entire area is 10 cm by 10 cm, and a work small area is 1 cm by 1 cm. That is to say, the work entire area is divided into 10 by 10 work small areas.

As shown in A in FIG. 2, an area subjected to hatching around the center of the work entire area is an exposure area corresponding to the cross-sectional shape data of the three-dimensional model, and a work small area positioned at the second row from the bottom of this work entire area, and at the third column from the left is enlarged and illustrated in B in FIG. 2. In B in FIG. 2, a profile line based on the cross-sectional shape data of the three-dimensional model is illustrated with a two-dot broken line, and light is irradiated on a unit area subjected to hatching on the inner side of the profile line thereof.

For example, if we say that the pixels of the spatial light modulator 17 are disposed in 1000 pixels by 1000 pixels, as shown in B in FIG. 2, a work small area is divided into 1000 by 1000 unit areas according to a pixel of the spatial light modulator 17 (i.e., areas corresponding to one pixel of the spatial light modulator 17). In this case, a work small area is 1 cm by 1 cm, so a unit area is 10 μm by 10 μm.

Thus, with optical shaping according to the tiling method, a range where light is irradiated through the spatial light modulator 17 is reduced, and multiple work small areas disposed in a tiled manner are sequentially exposed, whereby a unit area can be miniaturized as compared to a case wherein the work entire area is exposed at a time. Thus, the hardening layer can be formed with high precision, and consequently, the dimensional precision of a three-dimensional model can be improved.

Now, in general, when light is irradiated and hardened, the ultraviolet hardening resin 31 is contracted, for example, with a contracting ratio of around 7%. The ultraviolet hardening resin 31 is thus hardened and contracted, and accordingly, for example, the ultraviolet hardening resin 31 is hardened and contracted for each work small area where one-shot exposure is performed, joint strength between adjacent work small areas may be impaired, or the dimensional precision of the hardening layer may deteriorate.

Description will be made regarding influence due to the ultraviolet hardening resin 31 being hardened and contracted with reference to FIGS. 3A and 3B. In FIGS. 3A and 3B, the outside dimensions of work small area data generated by simply dividing the cross-sectional shape data (design data) are shown with a dotted line, and the outside dimensions of a hardening layer formed by light being irradiated based on the work small area data thereof, and the ultraviolet hardening resin 31 being hardened and contracted are shown with a solid line.

As shown in FIGS. 3A and 3B, when light is irradiated based on the work small area data generated by simply dividing the cross-sectional shape data, a gap occurs between hardening layers formed by the ultraviolet hardening resin 31 being hardened and contracted. Such a gap is hardened, for example, by post-hardening (hardening due to light being irradiated at subsequent processing), but with an area where the gap thereof is hardened, i.e., an area subjected to hatching in FIG. 3B, the strength thereof deteriorates as compared to the hardening layers of the work small areas, and accordingly, joint strength between the hardening layers of the work small areas deteriorates. Also, the dimension precision of the hardening layers corresponding to the entire exposure area deteriorates due to occurrence of such a gap.

In order to avoid influence due to the ultraviolet hardening resin 31 being hardened and contracted, with the optical shaping apparatus 11, the work small area data obtained by dividing the cross-sectional shape data is subjected to offset processing wherein the work small area data obtained by dividing the cross-sectional shape data is enlarged with offset width based on the contracting ratio of the ultraviolet hardening resin 31, and light is irradiated on an area which is wider than the work small area by the offset width, thereby forming a hardening layer of the work small area.

Description will be made regarding the hardening layer of the work small area formed based on the work small area data subjected to the offset processing with reference to FIG. 4. Two work small areas adjacently disposed are shown in FIG. 4, the outside dimensions of the work small area data subjected to the offset processing are shown with a dotted line, and the outside dimensions of a hardening layer formed by light being irradiated and the ultraviolet hardening resin 31 being hardened and contracted based on the work small area data thereof (design data) are shown with a solid line.

For example, if we say that the length of one side of work small area data generated by simply dividing the cross-sectional shape data is L, and the contracting ratio of the ultraviolet hardening resin 31 is S, the length L' of one side of the work small area data subjected to the offset processing is obtained with $L'=L+(L \times S/100)$.

The length L' of one side of the work small area data subjected to the offset processing is thus determined based on the contracting ratio S of the ultraviolet hardening resin 31, so the length of one side of the hardening layer formed by light being irradiated and the ultraviolet hardening resin 31 being hardened and contracted based on the work small area data subjected to the offset processing is equal to the length L of one side of the work small area data generated by simply dividing the cross-sectional shape data. That is to say, the hardening layer having the outside dimensions following the design data is obtained.

Accordingly, no gap occurs between the hardening layers formed by the ultraviolet hardening resin 31 being hardened and contracted, whereby deterioration in junction strength between the hardening layers such as referred to FIGS. 3A and 3B can be prevented. Thus, the strength of one layer worth of hardening layer corresponding to the entire exposure area (area subjected to hatching in A in FIG. 2) can be enhanced, and consequently, a three-dimensional model of which the strength is higher than a three-dimensional model according to the related art can be shaped.

Also, light is irradiated such that adjacent work small areas are overlapped by predetermined offset width, whereby the strength of one layer worth of hardening layer can further be enhanced.

Description will be made regarding offset for enabling adjacent work small areas to be overlapped mutually, with reference to FIG. 5. Now, hereafter, offset to be performed based on the contracting ratio of the ultraviolet hardening resin 31 will be referred to as first offset, and offset for enabling adjacent work small areas to be overlapped mutually will be referred to as second offset. Work small areas disposed 3 by 3 are shown in FIG. 5.

For example, when a work small area at the lower left is to be exposed, according to the first offset, the work small area data is enlarged such that an area which is wider by offset amount $\alpha$ is irradiated based on the contracting ratio S of the ultraviolet hardening resin 31.

Also, according to the second offset, data on the lower side (i.e., side adjacent to the work small area to be exposed) of the work small area data at the center on the left side having width corresponding to offset amount $\beta$ is added to the work small area data to be exposed, and data on the left side (i.e., side adjacent to the work small area to be exposed) of the work small area data on the lower side at the center having width corresponding to the offset amount $\beta$ is added to the work small area data to be exposed, and each of border lines are offset with the offset amount $\beta$. Now, the offset amount $\beta$ can be set to an arbitrary numeric value, and for example, can be set to around 10 μm.

The area which has been offset with the offset amount $\alpha$ according to the first offset, and the offset amount $\beta$ according to the second offset (i.e., area surrounded with a dotted line in FIG. 5) is exposed, the hardening layer of an area which has been subjected to hatching with the outside dimensions after hardening is formed. That is to say, a hardening layer is formed, which has been overlapped with adjacent work small areas on the upper side and right side of the work small area on the lower left with width corresponding to the offset amount $\beta$. Thus, a hardening layer is formed so as to be overlapped with adjacent work small areas, whereby junction between adjacent hardening layers can be further reinforced.

Also, with the second offset, a border line between adjacent work small areas is offset, so border lines which are not adjacent to work small areas (e.g., with the example in FIG. 5, border lines on the left and lower sides of a work small area to be exposed) do not have to be offset. That is to say, the offset processing method has to be changed depending on the position of a work small area.

Accordingly, for example, when dividing an exposure area into work small areas, the control unit 21 adds a symbol for identifying each of work small areas according to the order to be exposed, and sets a flag indicating presence/absence of adjacent work small areas to each of the work small areas, and the second offset is processed based on the flag thereof.

Figure 6A:
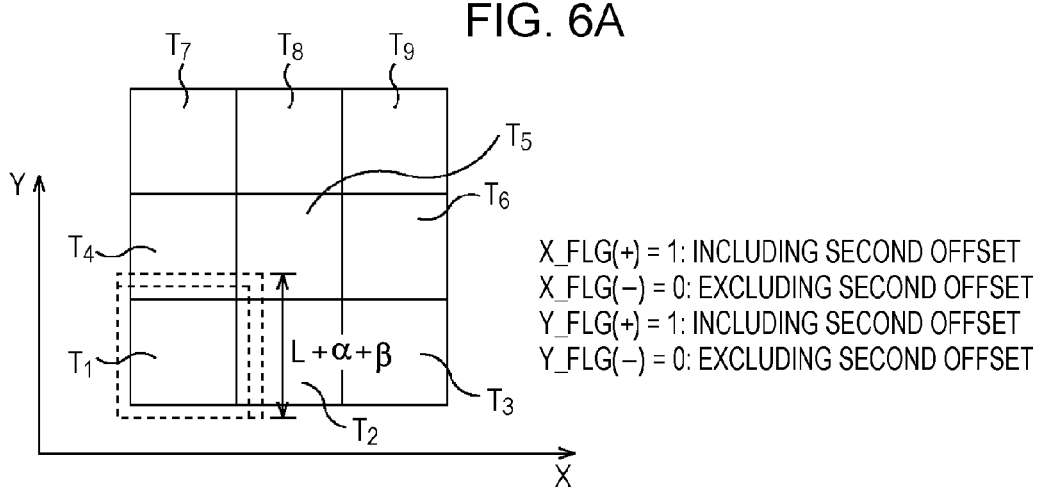
FIGS. 6A through 6C are diagrams for describing offset.
Figure 6B:
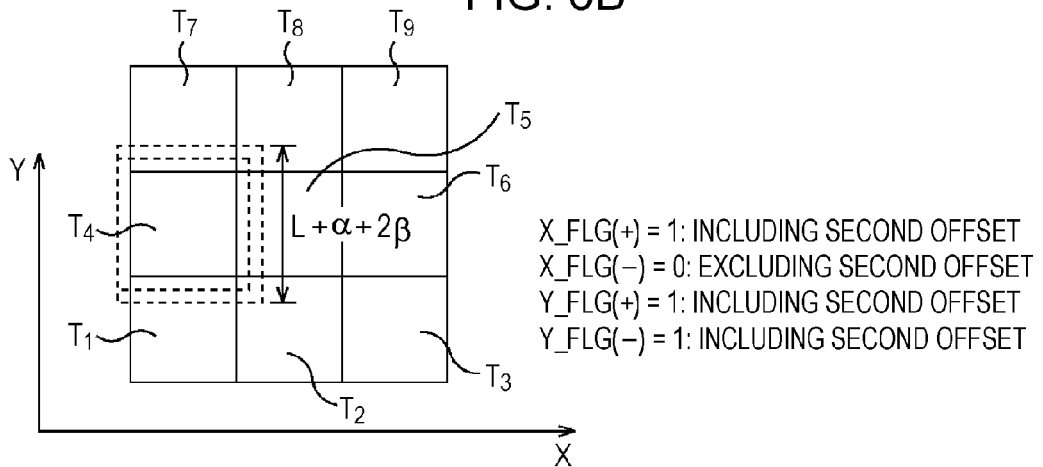
Figure 6C:
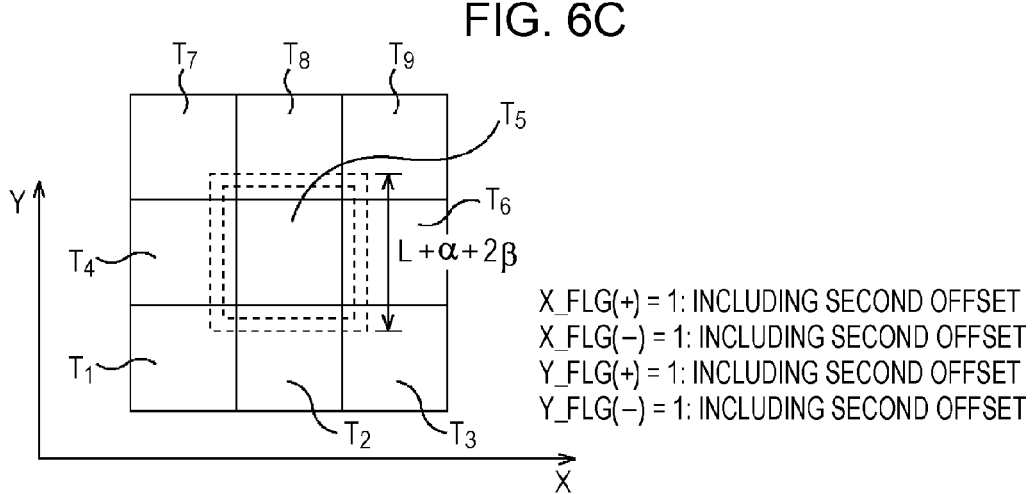

The second offset according to the position of a work small area will be described with reference to FIGS. 6A through 6C. In FIGS. 6A through 6C, similar to FIG. 5, nine work small areas disposed so as to be 3 by 3 are illustrated, for example, symbols $T_1$ through $T_9$ are appended to each of the work small areas in the raster scan order from the lower left to the upper right according to the order to be exposed.

The second offset as to the work small area $T_1$ will be described in FIG. 6A, the second offset as to the work small area $T_4$ will be described in FIG. 6B, and the second offset as to the work small area $T_5$ will be described in FIG. 6C.

As shown in FIG. 6A, the work small area $T_1$ is disposed at the lower left, the work small area $T_2$ is adjacent to the right side of the work small area $T_1$, and the work small area $T_4$ is adjacent to the upper side of the work small area $T_1$. Accordingly, when dividing an exposure area into work small areas, the control unit 21 sets a flag indicating presences of work small areas adjacent to the right and upper sides of the work small area $T_1$.

Specifically, with the work small area $T_1$, a flag X_FLG(+) indicating presence/absence of a work small area adjacent to the right side of the work small area is set to "1" indicating presence of an adjacent work small area, and a flag Y_FLG(+) indicating presence/absence of a work small area adjacent to the upper side of the work small area is set to "1" indicating presence of an adjacent work small area. Also, with the work small area $T_1$, a flag X_FLG(−) indicating presence/absence of a work small area adjacent to the left side of the work small area is set to "0" indicating absence of an adjacent work small area, and a flag Y_FLG(−) indicating presence/absence of a work small area adjacent to the lower side of the work small area is set to "0" indicating absence of an adjacent work small area.

Accordingly, when the work small area $T_1$ is subjected to the second offset based on these flags, processing is performed wherein a border line between the work small area $T_1$ and work small area $T_2$ is offset to the right side, and a border line between the work small area $T_1$ and work small area $T_4$ is offset to the upper side.

Also, as shown in FIG. 6B, the work small area $T_4$ is disposed on the left side at the center, the work small area $T_5$ is adjacent to the right side of the work small area $T_4$, the work small area $T_7$ is adjacent to the upper side of the work small area $T_4$, and the work small area $T_1$ is adjacent to the lower side of the work small area $T_4$. Accordingly, when dividing an exposure area into work small areas, the control unit 21 sets a flag indicating presences of work small areas adjacent to the right, upper, and lower sides of the work small area $T_4$.

Specifically, with the work small area $T_4$, a flag X_FLG(+) indicating presence/absence of a work small area adjacent to the right side of the work small area is set to "1" indicating presence of an adjacent work small area, a flag Y_FLG(+) indicating presence/absence of a work small area adjacent to the upper side of the work small area is set to "1" indicating presence of an adjacent work small area, and a flag Y_FLG(−) indicating presence/absence of a work small area adjacent to the lower side of the work small area is set to "1" indicating presence of an adjacent work small area. Also, with the work small area $T_4$, a flag X_FLG(−) indicating presence/absence of a work small area adjacent to the left side of the work small area is set to "0" indicating absence of an adjacent work small area.

Accordingly, when the work small area $T_4$ is subjected to the second offset based on these flags, processing is performed wherein a border line between the work small area $T_4$ and work small area $T_5$ is offset to the right side, a border line between the work small area $T_4$ and work small area $T_7$ is offset to the upper side, and a border line between the work small area $T_4$ and work small area $T_1$ is offset to the lower side.

Also, as shown in FIG. 6C, the work small area $T_5$ is disposed at the center of the four directions, the work small area $T_6$ is adjacent to the right side of the work small area $T_5$, the work small area $T_4$ is adjacent to the left side of the work small area $T_5$, the work small area $T_8$ is adjacent to the upper side of the work small area $T_5$, and the work small area $T_2$ is adjacent to the lower side of the work small area $T_5$. Accordingly, when dividing an exposure area into work small areas, the control unit 21 sets a flag indicating presences of work small areas adjacent to the right, left, upper, and lower sides of the work small area $T_5$.

Specifically, with the work small area $T_5$, a flag X_FLG(+) indicating presence/absence of a work small area adjacent to the right side of the work small area is set to "1" indicating presence of an adjacent work small area, and a flag X_FLG(−) indicating presence/absence of a work small area adjacent to the left side of the work small area is set to "1" indicating presence of an adjacent work small area. Also, with the work small area $T_5$, a flag Y_FLG(+) indicating presence/absence of a work small area adjacent to the upper side of the work small area is set to "1" indicating presence of an adjacent work small area, and a flag Y_FLG(−) indicating presence/absence of a work small area adjacent to the lower side of the work small area is set to "1" indicating presence of an adjacent work small area.

Accordingly, when the work small area $T_5$ is subjected to the second offset based on these flags, processing is performed wherein a border line between the work small area $T_5$ and work small area $T_6$ is offset to the right side, a border line between the work small area $T_5$ and work small area $T_4$ is offset to the left side, a border line between the work small area $T_5$ and work small area $T_8$ is offset to the upper side, and a border line between the work small area $T_5$ and work small area $T_2$ is offset to the lower side.

Next, FIG. 7 is a flowchart for describing processing for performing optical shaping according to the optical shaping apparatus 11 in FIG. 1. For example, upon three-dimensional shape data of a three-dimensional model created by CAD being input to the optical shaping apparatus 11, and operations for starting optical shaping being performed, in step S11 the control unit 21 executes a program for transforming the three-dimensional shape data of the three-dimensional model created by CAD into STL to transform the three-dimensional shape data of the three-dimensional model into STL.

After the processing in step S11, the processing proceeds to step S12, where the control unit 21 generates the cross-sectional shape data of the three-dimensional model from the three-dimensional shape data transformed into STL, and the processing proceeds to step S13. Also, when generating the cross-sectional shape data of the three-dimensional model, for example, the attitude and orientation of the three-dimensional model are determined, and data for shaping a member for preventing the three-dimensional model from falling during shaping, and so forth are generated.

In step S13, the control unit 21 divides one layer of cross-sectional shape data to be processed (e.g., first, the cross-sectional shape data of the lowermost layer) according to work small areas, and creates (generates) work small area data. At this time, as described with reference to FIGS. 6A through 6C, the control unit 21 adds a symbol for identifying each of the work small areas, and a flag indicating presence/absence of adjacent work small areas to each of the work small area data.

After the processing in step S13, the processing proceeds to step S14, where the control unit 21 subjects a work small area to be exposed to the first offset for enlarging the work small area to be exposed with the offset α based on the contracting ratio of the ultraviolet hardening resin 31 according to the order to be exposed, and the processing proceeds to step S15.

In step S15, the control unit 21 subjects the work small area to be exposed to the second offset for offsetting a border line with the offset β based on the flag added to the work small area thereof, and the processing proceeds to step S16.

In step S16, the control unit 21 supplies a driving signal for driving each pixel of the spatial light modulator 17 to the spatial light modulator 17 so as to irradiate light on a unit area serving as an irradiation area, and the spatial light modulator 17 drives each pixel such that light irradiated from the light source 12 passes through the pixel corresponding to the unit area serving as a irradiation area. Subsequently, the control unit 21 opens the shutter 13 for a predetermined exposure period to expose the irradiation area of the surface of the ultraviolet hardening resin 31.

After the processing in step S16, the processing proceeds to step S17, where the control unit 21 determines whether or not exposure based on one layer worth of all of work small area data generated in step S13 has been performed.

In a case wherein in step S17 the control unit 21 has determined that exposure based on one layer worth of all of work small area data has not been performed, the processing proceeds to step S18, where the control unit 21 controls the driving unit 34 to move the stage 33 such that exposure is performed upon the next work small area of the work small area wherein exposure has been performed in step S16 which is immediately before step S17.

After the processing in step S18, the processing returns to step S14, where the same processing is repeated with the next work small area of the work small area wherein exposure is performed in the last step S16 as a processing target.

On the other hand, in a case wherein in step S17 the control unit 21 has determined that exposure based on one layer worth of all of work small area data has been performed, the processing proceeds to step S19, where the control unit 21 determines regarding whether or not exposure based on all of the cross-sectional shape data generated in step S12 has been performed.

In a case wherein in step S19 the control unit 21 has determined that exposure based on all of the cross-sectional shape data has not been performed, the processing returns to step S13, where the same processing is repeated with the cross-sectional shape data of the next layer of the layer wherein exposure is performed in the last steps S13 through S16 as a processing target.

On the other hand, in a case wherein in step S19 the control unit 21 has determined that exposure based on all of the cross-sectional shape data has been performed, the three-dimensional model is completed, and the processing is ended.

As described above, the optical shaping apparatus 11 subjects the work small area data to the first offset and second offset, exposes an area wider than a work small area, so as described with reference to FIG. 5, the strength of one layer worth of hardening layers can be enhanced. Also, such as described with reference to FIGS. 3A and 3B, deterioration in dimensional precision due to occurrence of a gap can be prevented, and accordingly, the hardening layer can be shaped in a high-precision manner. Accordingly, a three-dimensional model shaped by such a hardening layer being layered can be shaped with high precision and high strength.

A microchip, connector, microcapsule, or the like, or a prototype of various types of fine component can be shaped by employing such an optical shaping apparatus 11. For example, a three-dimensional model shaped by employing the optical shaping apparatus 11 is shaped with high strength, so when coating this with nickel or the like, and transferring the model thereof, such coating is prevented from peeling off for each of the work small areas.

Note that in addition to a transmissive liquid crystal panel, a digital micromirror device (DMD) made up of multiple minute reflection mirrors being arrayed wherein the tilt angle is changed according to an input signal, reflective liquid crystal on silicon (LCOS), or the like may be employed as the spatial light modulator 17. In the case of employing a digital micromirror device, each micromirror corresponds to one unit area, so the polarizing plate 14 does not have to be provided.

Also, with the present embodiment, work small area data is subjected to both of the first offset and second offset processing, but small area data may be subjected to one of the first offset and second offset, and in this case, a three-dimensional model can be shaped with higher strength as compared to a three-dimensional model according to the related art.

Further, an arrangement may be made wherein an irradiation area of the surface of the ultraviolet hardening resin 31 is subjected to one-shot exposure through the spatial light modulator 17, and a beam scanning exposure wherein an optical beam is scanned along the profile line of the irradiation area. Combining one-shot exposure and beam scanning exposure enables a three-dimensional model to be shaped with higher precision.

Note that work small areas are not restricted to square work small areas, and accordingly, it goes without saying that the dimension in the X direction and the dimension in the Y direction may differ.

Also, the present invention may be applied to not only the optical shaping apparatus 11 for performing optical shaping by a free liquid level method which is a technique wherein light subjected to spatial modulation by the spatial light modulator 17 is irradiated from above the ultraviolet hardening resin 31, but also an optical shaping apparatus for performing optical shaping by a fluid surface regulation method which is a technique wherein light subjected to spatial modulation by the spatial light modulator 17 is irradiated on the interface between the ultraviolet hardening resin 31 and housing container 32.

For example, the bottom face of the housing container 32 is configured of a material for transmitting light, such as glass or the like, and light subjected to spatial modulation by the spatial light modulator 17 is irradiated on the interface between the glass thereof and ultraviolet hardening resin 31 from the lower portion of the ultraviolet hardening resin 31. That is to say, the surface of the ultraviolet hardening resin 31 where light corresponding to the cross-sectional shape data of a three-dimensional model is irradiated includes the interface between the glass and ultraviolet hardening resin 31.

With the fluid surface regulation method, processing is repeated wherein the stage 33 is disposed such that the distance between the housing container 32 and stage 33 is equal to the thickness of one layer worth of hardening layers, and the stage 33 is driven upward in the vertical direction such that the distance between the housing container 32 and stage 33 is equal to the thickness of one layer worth of hardening layers step by step in response to one hardening layer of a three-dimensional model being formed according to light irradiated on the ultraviolet hardening resin 31 through the glass of the bottom face of the housing container 32, thereby forming the three-dimensional model.

Thus, the surface (interface) of the ultraviolet hardening resin 31 where light is irradiated is regulated by glass, thereby shaping the thickness of one layer worth of hardening layers accurately, so layering precision can be improved, and thus, a three-dimensional model can be formed with high precision.

Also, the above-mentioned series of processing performed by the control unit 21 can be executed by not only hardware but also software. In the case of executing the series of processing by software, a program making up the software is installed from a program recording medium to a computer embedded in dedicated hardware, or a general-purpose personal computer or the like capable of executing various types of function by various types of program being installed.

FIG. 8 is a block diagram illustrating a configuration example of a computer wherein the above-mentioned series of processing is executed by the program. With the computer, a CPU (Central Processing Unit) 101, ROM (Read Only Memory) 102, and RAM (Random Access Memory) 103 are connected mutually by a bus 104.

An input/output interface 105 is further connected to the bus 104. The input/output interface 105 is connected with an input unit 106 made up of a keyboard, mouse, microphone and so forth, an output unit 107 made up of a display, speaker, and so forth, a storing unit 108 made up of a hard disk, nonvolatile memory, and so forth, a communication unit 109 made up of a network interface and so forth, and a drive 110 for driving a removable medium 111 such as a magnetic disk, optical disc, magneto-optical disk, semiconductor memory, or the like.

With the computer thus configured, the above-mentioned series of processing is performed, for example, by the CPU 101 loading a program stored in the storing unit 108 in the RAM 103 through the input/output interface 105 and bus 104 and executing this.

The program executed by the computer (CPU 101) is provided by being recorded in the removable medium 111 which is a package medium made up of a magnetic disk (including a flexible disk), optical disc (CD-ROM (Compact Disc-Read Only Memory), DVD (Digital Versatile Disc), etc.), magneto-optical disk, semiconductor memory, or the like, or provided through a cable or wireless transmission medium such as a local area network, the Internet, or digital satellite broadcasting.

Subsequently, the removable medium 111 is mounted on the drive 110, whereby the program can be installed in the storing unit 108 through the input/output interface 105. Also, the program can be received at the communication unit 109 through a cable or wireless transmission medium, and installed in the storing unit 108. Alternatively, the program can be installed in the ROM 102 or storing unit 108 beforehand.

Note that the program executed by the computer may be a program wherein processing is performed in time sequence along the order described in the present Specification, or may be a program wherein processing is performed in parallel or at appropriate timing such that calling is performed. Alternatively, the program may be processed by one CPU, or may be processed by multiple CPUs in a distributed manner.

Note that embodiments of the present invention are not restricted to the above-mentioned embodiment, and various modifications may be made without departing from the essence and scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An optical shaping apparatus configured to irradiate light according to the cross-sectional shape data of a three-dimensional model on the surface of a light hardening resin to form a hardening layer, and layer said hardening layer to shape said three-dimensional model, comprising:

data generating means configured to divide the cross-sectional shape data of said three-dimensional model according to work small areas obtained by dividing a work entire area where optical shaping work is performed into a plurality of areas, and generate work small area data which is cross-sectional shape data corresponding to said work small areas;

enlarging means configured to enlarge said work small area data with offset width based on the contracting ratio of said light hardening resin; and one-shot exposing means configured to subject areas, which are wider than said work small areas on the surface of said light hardening resin by said offset width, to one-shot exposure based on said work small area data enlarged by said enlarging means to form said hardening layer for each of said work small areas.

2. The optical shaping apparatus according to claim 1, further comprising:

adding means configured to add data with certain width from a border line between said predetermined work small area and said other work small areas, of work small area data corresponding to said other work small areas adjacent to said predetermined work small area, to said work small area data corresponding to said predetermined work small area, thereby offsetting said border line of said predetermined work small area;

wherein said one-shot exposing means subject areas, which are wider than said work small areas on the surface of said light hardening resin by width obtained by adding said certain width and said offset width, to one-shot exposure based on said work small area data offset by said adding means, and enlarged by said enlarging means.

3. An optical shaping method adapted to irradiate light according to the cross-sectional shape data of a three-dimensional model on the surface of a light hardening resin to form a hardening layer, and layer said hardening layer to shape said three-dimensional model, comprising the steps of:

dividing the cross-sectional shape data of said three-dimensional model according to work small areas obtained by dividing a work entire area where optical shaping work is performed into a plurality of areas, and generating work small area data which is cross-sectional shape data corresponding to said work small areas;

enlarging said work small area data with offset width based on the contracting ratio of said light hardening resin; and subjecting areas, which are wider than said work small areas on the surface of said light hardening resin by said offset width, to one-shot exposure based on said work small area data to form said hardening layer for each of said work small areas.

4. An optical shaping apparatus configured to irradiate light according to the cross-sectional shape data of a three-dimensional model on the surface of a light hardening resin to form a hardening layer, and layer said hardening layer to shape said three-dimensional model, comprising:

data generating means configured to divide the cross-sectional shape data of said three-dimensional model according to work small areas obtained by dividing a work entire area where optical shaping work is performed into a plurality of areas, and generate work small area data which is cross-sectional shape data corresponding to said work small areas;

adding means configured to add data with certain width from a border line between said predetermined work small area and said other work small areas, of work small area data corresponding to said other work small areas adjacent to said predetermined work small area, to said work small area data corresponding to said predetermined work small area, thereby offsetting said border line of said predetermined work small area; and one-shot exposing means configured to subject areas, which are wider than said work small areas on the surface of said light hardening resin by said certain width, to one-shot exposure based on said work small area data offset by said adding means to form said hardening layer for each of said work small areas.

5. The optical shaping apparatus according to claim 4, further comprising:

enlarging means configured to enlarge said work small area data with offset width based on the contracting ratio of said light hardening resin;

wherein said one-shot exposing means subject areas, which are wider than said work small areas on the surface of said light hardening resin by width obtained by adding said certain width and said offset width, to one-shot exposure based on said work small area enlarged by said enlarging means, and offset by said adding means.

6. An optical shaping method adapted to irradiate light according to the cross-sectional shape data of a three-dimensional model on the surface of a light hardening resin to form a hardening layer, and layer said hardening layer to shape said three-dimensional model, comprising the steps of:

dividing the cross-sectional shape data of said three-dimensional model according to work small areas obtained by dividing a work entire area where optical shaping work is performed into a plurality of areas, and generating work small area data which is cross-sectional shape data corresponding to said work small areas;

adding data with certain width from a border line between said predetermined work small area and said other work small areas, of work small area data corresponding to said other work small areas adjacent to said predetermined work small area, to said work small area data corresponding to said predetermined work small area, thereby offsetting said border line of said predetermined work small area; and subjecting areas, which are wider than said work small areas on the surface of said light hardening resin by said certain width, to one-shot exposure based on said work small area data to form said hardening layer for each of said work small areas.

7. An optical shaping apparatus which irradiates light according to the cross-sectional shape data of a three-dimensional model on the surface of a light hardening resin to form a hardening layer, and layer said hardening layer to shape said three-dimensional model, comprising:

a data generating unit which divides the cross-sectional shape data of said three-dimensional model according to work small areas obtained by dividing a work entire area where optical shaping work is performed into a plurality of areas, and generates work small area data which is cross-sectional shape data corresponding to said work small areas;

an enlarging unit which enlarges said work small area data with offset width based on the contracting ratio of said light hardening resin; and a one-shot exposing unit which subjects areas, which are wider than said work small areas on the surface of said light hardening resin by said offset width, to one-shot exposure based on said work small area data enlarged by said enlarging unit to form said hardening layer for each of said work small areas.

8. An optical shaping apparatus which irradiates light according to the cross-sectional shape data of a three-dimensional model on the surface of a light hardening resin to form a hardening layer, and layer said hardening layer to shape said three-dimensional model, comprising:

a data generating unit which divides the cross-sectional shape data of said three-dimensional model according to work small areas obtained by dividing a work entire area where optical shaping work is performed into a plurality of areas, and generates work small area data which is cross-sectional shape data corresponding to said work small areas;

an adding unit which adds data with certain width from a border line between said predetermined work small area and said other work small areas, of work small area data corresponding to said other work small areas adjacent to said predetermined work small area, to said work small area data corresponding to said predetermined work small area, thereby offsetting said border line of said predetermined work small area; and a one-shot exposing unit which subjects areas, which are wider than said work small areas on the surface of said light hardening resin by said certain width, to one-shot exposure based on said work small area data offset by said adding unit to form said hardening layer for each of said work small areas.

* * * * *